(12) United States Patent
Lindner et al.

(10) Patent No.: US 11,571,700 B2
(45) Date of Patent: Feb. 7, 2023

(54) MOBILE WASTE COMMINUTING DEVICE COMPRISING A SERIES-CONNECTED HYBRID DRIVE SYSTEM

(71) Applicant: Manuel Lindner, Spittal/Drau (AT)

(72) Inventors: Manuel Lindner, Spittal/Drau (AT); Peter Schiffer, Millstatt (AT)

(73) Assignee: Manuel Lindner, Spittal/Drau (AT)

( * ) Notice: Subject to any disclaimer, the term of this patent is extended or adjusted under 35 U.S.C. 154(b) by 1101 days.

(21) Appl. No.: 16/306,484

(22) PCT Filed: May 23, 2017

(86) PCT No.: PCT/EP2017/062391
§ 371 (c)(1),
(2) Date: Nov. 30, 2018

(87) PCT Pub. No.: WO2017/207345
PCT Pub. Date: Dec. 7, 2017

(65) Prior Publication Data
US 2019/0291120 A1 Sep. 26, 2019

(30) Foreign Application Priority Data
Jun. 1, 2016 (EP) .................................... 16172395

(51) Int. Cl.
H02P 9/48 (2006.01)
H02P 21/05 (2006.01)
(Continued)

(52) U.S. Cl.
CPC ............... B02C 4/42 (2013.01); B02C 13/30 (2013.01); B02C 18/14 (2013.01); B02C 18/24 (2013.01);
(Continued)

(58) Field of Classification Search
CPC ..................................... H02P 9/04; H02P 9/48
See application file for complete search history.

(56) References Cited

U.S. PATENT DOCUMENTS

2011/0240778 A1 10/2011 Yamamoto et al.
2012/0234949 A1 9/2012 Morey
(Continued)

FOREIGN PATENT DOCUMENTS

CN 102712265 A 10/2012
CN 203379953 U 1/2014
(Continued)

OTHER PUBLICATIONS

Office Action issued by the Chinese Patent Office for Chinese Patent Application No. 201780034493.2, dated Jul. 29, 2021.
(Continued)

*Primary Examiner* — Kawing Chan
*Assistant Examiner* — Charles S Laughlin
(74) *Attorney, Agent, or Firm* — Moore & Van Allen, PLLC; Henry B. Ward, III

(57) ABSTRACT

The mobile waste comminuting device of the invention comprises: at least one comminuting shaft; an internal combustion engine; at least one generator that is coupled to the internal combustion engine to convert mechanical energy supplied by the internal combustion engine into electric energy; at least one electric motor which is powered by the electric energy so as to drive the at least one comminuting shaft and change the direction of rotation thereof; and an energy store for storing energy and at least partly powering the at least one electric motor with electric energy, in particular for storing energy during periods of low power demand and supplying energy during periods of high power demand in relation to the nominal power of the at least one generator.

19 Claims, 3 Drawing Sheets

(51) Int. Cl.
| | | |
|---|---|---|
| | *B02C 4/42* | (2006.01) |
| | *B02C 21/02* | (2006.01) |
| | *B02C 25/00* | (2006.01) |
| | *B02C 13/30* | (2006.01) |
| | *B02C 18/14* | (2006.01) |
| | *B02C 18/24* | (2006.01) |
| | *B60K 6/00* | (2006.01) |
| | *B60K 6/28* | (2007.10) |
| | *H02J 3/00* | (2006.01) |

(52) U.S. Cl.
CPC .............. *B02C 21/02* (2013.01); *B02C 25/00* (2013.01); *B60K 6/00* (2013.01); *B60K 6/28* (2013.01); *H02J 3/00* (2013.01)

(56) References Cited

U.S. PATENT DOCUMENTS

| | | | |
|---|---|---|---|
| 2013/0206490 A1 | 8/2013 | Kouvo et al. | |
| 2013/0313351 A1 | 11/2013 | Beam, III | |
| 2014/0243149 A1* | 8/2014 | Holmes | B60W 20/20 180/65.265 |
| 2014/0373533 A1* | 12/2014 | Jensen | F01K 27/02 903/915 |
| 2016/0138466 A1* | 5/2016 | Ge | B60K 25/06 60/624 |

FOREIGN PATENT DOCUMENTS

| | | |
|---|---|---|
| CN | 204911696 U | 12/2015 |
| CN | 105562421 A | 5/2016 |
| CN | 205253320 U | 5/2016 |
| WO | 2014039603 A1 | 3/2014 |

OTHER PUBLICATIONS

Second Office Action Issued by the Chinese Patent Office for Chinese Application No. 201780034493.2, dated Feb. 1, 2021.
Search Report issued by the Chinese Patent Office for Chinese Application No. 201780034493.2, dated Jan. 24, 2021.
Fourth Office Action issued by the Chinese Patent Office for Chinese Patent Application No. 201780034493.2, dated Dec. 23, 2021.
International Search Report issued for corresponding International Patent Application No. PCT/EP2017/062391 dated Aug. 10, 2017.
Written Opinion issued for corresponding International Patent Application No. PCT/EP2017/062391 dated Aug. 10, 2017 (English language translation not attached).
China Office Action issued by the Chinese Patent Office for corresponding China Application No. 201780034493.2, dated May 25, 2020.

* cited by examiner

MOBILE WASTE COMMINUTING DEVICE COMPRISING A SERIES-CONNECTED HYBRID DRIVE SYSTEM

FIELD OF THE INVENTION

The invention relates to a mobile comminuting device with at least one comminuting shaft, an internal combustion engine, and a generator that is coupled to the internal combustion engine to convert mechanical energy of the internal combustion engine into electric energy, and at least one electric motor to convert the electric energy into mechanical energy to drive the comminuting shaft, without and with the support of an electric or mechanical energy store.

PRIOR ART

In comminuting and reprocessing machines (shredders) for various input materials (such as, for example, commercial waste, industrial waste, electronic scrap, metal scrap, plastics, composites, rubber, wood), mobile machines, e. g. with MOT approval, are often employed. The mobile comminuting machines are usually employed for varying sites of application. These comminuting machines have one or several driven comminuting shafts by which the input material is crushed.

In contrast to stationary comminuting machines, it is typical that the mobile machines work in an autarkic manner, without external energy supply. Due to the often missing energy supply (e. g. electric connection), it is therefore necessary for these machines to be equipped with a separate energy supplier (preferably a diesel engine).

The diesel engine (industrial diesel engine) provides a speed within a range of e. g. 1500 to 2100 rpm. In order to be able to adapt this speed to the often clearly lower speed of the comminuting shaft of up to e. g. 1000 rpm, and to also allow for an easily performed change of the direction of rotation, a "hydraulic transmission" is typically employed. Examples of typically employed shaft speeds are 10 to 80 rpm for a double-shaft comminuting machine; 5 to 200 or 90 to 500 rpm for a single-shaft comminuting machine, and 9 to 800 rpm for a (vertical) mill.

In all following descriptions, both concerning prior art and the description of the invention, only one component of the system each is indicated for simplification reasons. Naturally, two or more components may be present or provided in the system each. For example, one comminuting shaft or generator or electric motor each is always indicated. Depending on the comminuting system, there may also be two or more comminuting shafts. Moreover, as to the driving components, there may be e. g. a plurality of internal combustion engines, generators, electric motors or energy stores and other multiple components.

A drive is referred to as hydraulic drive if via one or several hydraulic pumps (directly at the diesel engine or flanged to it via power dividers), which in turn drive one or several hydraulic motors at the comminuting shaft or shafts directly or via an ancillary transmission. Both the pump and the motor are in most cases designed as axial slewing pump or motor which necessarily involves extreme noise generation. With this constellation, the desired variability of the comminuting shaft speed, the shaft's direction of rotation, and the shaft's torque may be easily achieved.

In the crushers with the hydrostatic drive described herein, the speed of the comminuting shaft is in most cases controlled depending on pressure such that the hydraulic motor is driven with the highest possible speed in proportion to the torque required for comminuting. This is necessary to achieve the highest-possible throughput with a comminuting system driven in this manner.

If a certain given hydraulic pressure is reached at the hydraulic motor, i. e. if the torque required for comminuting is no longer sufficient and the pressure increases thereby, the speed of the shaft is continuously reduced and thus the torque correspondingly proportionally increased at a constant pressure. Either until a certain minimum speed is reached or if, despite the reduction of the speed and thus the increase of the torque, a standstill, i. e. a blocking of the shaft, occurs.

If the pressure required for comminuting and thus the torque are reduced, the speed of the shaft is continuously increased again until a predetermined pressure is reached.

For very high torques, the hydraulic drive components may also be designed to be very small with high speeds for cost efficiency reasons, and the desired comminuting shaft speed and the desired comminuting shaft torque may then by achieved via an ancillary transmission (a reduction gear between the hydraulic drive and the comminuting shaft).

Due to the system, however, the energy efficiency of hydraulic drives results in a bad overall efficiency of about 0.14 to 0.24, with the following exemplary though typical assumption: efficiency of the diesel engine 0.35 to 0.4 and efficiency of the hydraulic drive with a part load proportion of 0.4 to 0.6, depending on the proportion of the full or part load operation.

This bad efficiency of the hydrostatic system, however, also means that for heat dissipation, larger cooling units have to be provided, which requires additional energy for the drive of the fans that are required for this, whereby efficiency is deteriorated even more.

An essential feature of the hydrostatic drives described herein is moreover that they do not have any possibility of a very short power increase as once a given maximum pressure and minimum speed, i. e. a maximum torque, is reached, the power capacity of such a system is exhausted.

With the comminuting procedures described herein, however, there are load peaks within small millisecond (ms) ranges which the hydrostatic drive system described herein cannot cover.

FIG. 1 shows, in a measuring diagram, the torques of such a comminuting process that highly change within short intervals and the resulting required quick changes of the speed of the comminuting shaft.

If the torque required for comminuting is not sufficient despite the reduction of the speed of the shaft, the comminuting shaft will be blocked.

To be able to continue the comminuting procedure, the direction of rotation of the shaft is changed for a short period, i.e. a reversing operation is performed, and then the normal comminuting procedure is continued again.

One could only counteract to this by increasing the efficiency of this hydrostatic system by enlarging the pump and the motor such that in the normal comminuting process, only a portion of the power is used, such that an additional, directly retrievable power reserve is thereby available when such load peaks are reached.

Such a solution is first of all out of question due to the thereby required higher costs and the higher weight of mobile crushers, and moreover due to the further deterioration of efficiency, as a hydrostatic drive system designed in this way would largely only be operated in the part load range. The deadlocks of the comminuting shaft resulting from such load peaks and the thus compulsory reversing operations of the shaft, however, reduce the throughput of such a hydrostatically driven crusher.

In addition, a hydrostatic system at comminuting devices driven in such a manner is very slow as to the reactions of the speed and thus the torque changes even within the capacities of the system.

So if within short intervals, a reduction of speed is required to increase the torque, but then an increase of speed within short term is possible and also necessary to achieve a preferably high throughput, the control system of such a hydrostatic drive may only follow in a very slow manner, which also is at the cost of the throughput.

A possible impairment of the environment by the contamination of soil when the hydraulic system is leaking, or in case of any faults thereof, must not be misjudged.

Therefore, mobile comminuting machines are by default operated with a diesel engine as the energy supplier. On the market of mobile comminuting machines, at present, the technical solution with a hydraulic drive, which couples the diesel engine to the hydraulic drive (hydraulic pump(s) and hydraulic motor) and optionally includes an ancillary transmission, has in most cases established as an inexpensive solution despite many disadvantages. Mobile comminuting machines of this design are very reliable and well-known from prior art. For the different applications with mobile comminuting machines, various embodiments of diesel-hydraulic drives are installed.

Now, there are also available, for the first time, prototypes of comminuting technology, e. g. for wood, to produce so-called wood chips, and for the breaking of rocks and concrete. For this, the hydraulic pump at the diesel or the internal combustion engine is replaced by a generator for generating electric energy. The thus generated electric energy is then converted back into mechanical energy for driving the comminuting tools by an electric motor. These comminuting units, however, are only operated at a nearly constant speed due to the system. There are only very low speed variations between the idling and the operation of such crushers.

With these electric drives, there is no reduction of the speed for increasing the torque, as is the case with the hydrostatic drives described above and the novel inventive drive described below. This is not even technically possible with these comminuting units, for the actual comminuting operation could not be performed thereby.

The electric drives for comminuting machines for manufacturing wood chips or for breaking rocks and concrete moreover only have one direction of rotation of the comminuting tools and do not need any other direction of rotation, and due to the system, they cannot even change their direction of rotation. However, with the electric drives according to the invention, a change of the direction of rotation is possible and necessary.

The energy stores in the form of condensers, so-called SuperCAPS, employed in these comminuting units are not used here in order to influence speed, but they are provided to cover load peaks for very short periods which cannot be followed by the diesel drive due to its inertia.

DESCRIPTION OF THE INVENTION

It is the object of the invention to provide an energetically more efficient mobile waste comminuting device.

The object is achieved by a mobile waste comminuting device according to patent claim 1. Preferred developments are defined in the dependent claims.

The mobile waste comminuting device according to the invention comprises: at least one comminuting shaft; an internal combustion engine; at least one generator that is coupled to the internal combustion engine to convert mechanical energy of the internal combustion engine into electric energy; at least one electric motor provided with the electric energy for driving and changing the direction of rotation of the at least one comminuting shaft; and an energy store for storing energy and for at least partly powering the at least one electric motor with electric energy, in particular for storing energy during periods of low power demand and for supplying energy during periods of high power demand relative to the nominal power of the at least one generator.

The mobile waste comminuting device according to the invention in particular has the advantage that a change of the direction of rotation of the at least one comminuting shaft may be effected with the at least one electric motor whereby a transmission otherwise required for this may be omitted. For example, an electric motor may change its direction of rotation and in this manner cause a change of the direction of rotation of the comminuting shaft. As an alternative, two electric motors may be provided, for example at a comminuting shaft, wherein each individual electric motor only drives the comminuting shaft in one direction of rotation, and a change of the direction of rotation is effected by switching from one electric motor to the other one.

The mobile waste comminuting device may furthermore comprise: at least one AC/DC converter to convert alternating current from the at least one generator into direct current, a DC/AC-converter to convert direct current into alternating current for the at least one electric motor, and an intermediate circuit arranged between the AC/DC converter and the DC/AC converter with an energy management module for coupling the energy store, wherein each electric motor is an AC motor.

The speed of the at least one comminuting shaft may be varied by the at least one electric motor. In this manner, for example the torque of the electric motor may be increased by reducing the speed, for example to be able to crush larger parts of input material and thus preferably prevent the at least one comminuting shaft from getting stuck.

The mobile waste comminuting device may furthermore comprise: a device for avoiding surge voltages, preferably a brake chopper, in particular for restricting a voltage in the intermediate circuit.

The mobile waste comminuting device may furthermore comprise: a controlling system or controller for controlling the energy flux between the at least one generator, the at least one electric motor and the energy store.

The controlling system or controller may be embodied to control the operation of the internal combustion engine, and/or to control the energy flux between the at least one generator, the at least one electric motor and the energy store, wherein in particular a power quantity for driving the at least one comminuting shaft not available from the generator is provided from the energy store for the electric motor, and/or to cause an increase of the torque, in particular, if the torque for comminuting at a certain speed is not sufficient, the electric motor power and thus the torque are increased, and if the torque is still not sufficient, the speed is reduced and thus the torque is furthermore increased, and/or to restrict the power maximally taken from the at least one generator to the nominal power, and/or to allow a starting procedure of the waste comminuting device and the driving of the at least one comminuting shaft not before the minimum energy amount is contained in the energy store, and/or to control the energy supply from the energy store to the at least one electric motor for covering the load peaks that are beyond the nominal power of the at least one generator, and/or, if load valleys where a power consumption of the at least one electric motor fall below the nominal power of the at least one generator, to employ a difference between the nominal power and the power consumption of the at least one electric motor for charging the energy store, and/or to operate, during a braking operation of the at least one comminuting shaft, the at least one electric motor as a generator and to use the power generated in the process for charging the energy store.

In this manner, for example a power quantity not available from the generator for driving the at least one comminuting shaft may be drawn from the energy store for the electric motor. Reducing the speed of the at least one comminuting shaft may cause an increase of the torque if required.

According to another development, the energy store may comprise at least one electric energy store and/or one mechanical energy store, wherein the electric energy store may in particular comprise a rechargeable battery and/or a condenser and/or a superconducting magnetic energy store, and/or a static, uninterruptable power supply (UPS), and/or wherein the mechanical energy store may in particular comprise a dynamic UPS and/or a centrifugal mass store and/or a flywheel store.

In case of a mechanical energy store, a converter means to convert electric into mechanical and mechanical into electric energy is preferably provided.

In one development, two or more comminuting shafts having one electric motor each may be provided, wherein furthermore in particular one generator may be provided for each electric motor.

According to another development, the energy store may be chargeable via a mains connection. This provides an additional possibility of charging the energy store.

The object according to the invention is also achieved by a method according to patent claim 11. Preferred developments are defined in the dependent claims.

The method of operating the mobile waste comminuting device according to the invention comprises the following steps: operating the internal combustion engine; generating electric energy with the at least one generator; driving the at least one comminuting shaft with the at least one electric motor; storing energy in the energy store, in particular during periods of low power demand, relative to a nominal power of the at least one generator; at least partly powering the at least one electric motor with electric energy from the energy store, in particular powering the at least one electric motor with electric energy from the energy store for covering a portion of periods of high power demand going beyond the nominal power of the at least one generator.

Furthermore, a reversion of the direction of rotation of the at least one comminuting shaft may be provided. Thereby, shafts that got stuck by crushed material may be released again, for example.

The method according to the invention may comprise the following further step: controlling the energy flux between the at least one generator, the at least one electric motor and the energy store.

Moreover, one or more of the following steps may be provided: controlling the energy flux between the at least one generator, the at least one electric motor and the energy store, wherein in particular a power quantity not available from the generator for driving the at least one comminuting shaft is provided from the energy store for the electric motor, and/or increasing the torque, in particular, if the torque for comminuting at a certain speed is not sufficient, the electric motor power and thus the torque are increased, and if the torque is still not sufficient, the speed is reduced and thus the torque further increased, and/or restricting the power maximally drawn from the at least one generator to the nominal power, and/or starting the waste comminuting device if a minimum energy amount is contained in the energy store, and/or driving the at least one comminuting shaft after the starting procedure of the waste comminuting device if the minimum energy amount is contained in the energy store, and/or controlling the energy supply from the energy store to the at least one electric motor for covering the load peaks that are beyond the nominal power of the at least one generator, and/or charging the energy store if load valleys occur where a power consumption of the at least one electric motor falls below the nominal power of the at least one generator, by utilizing a difference between the nominal power and the power consumption of the at least one electric motor, and/or operating the at least one electric motor as a generator in case of a braking operation of the at least one comminuting shaft and using the power generated thereby for charging the energy store.

The method may comprise the following further step: converting alternating current of the at least one generator into direct current, using at least a portion of the direct current for storing energy in the energy store, and converting direct current into alternating current for powering the at least one electric motor embodied in the form of an alternating current motor with energy from the at least one generator and/or with energy from the energy store.

The method may comprise the following further step: restricting the voltage generated during a braking operation of the at least one comminuting shaft by the at least one electric motor acting as a generator.

Further features and exemplary embodiments as well as advantages of the present invention will be illustrated more in detail hereinafter with reference to the drawings. It will be understood that the embodiments do not exhaust the field of the present invention. It will be furthermore understood that some or all features described below may also be combined with each other in a different way.

EMBODIMENTS

It is the object of the invention to provide an energetically more efficient mobile waste comminuting device as was already indicated above.

By increasing efficiency, the use of a smaller diesel engine or, with the same size of the diesel engine, an increase of the throughput is to be permitted.

Thereby, a decrease of $CO_2$ emissions is also to be achieved absolutely as well as specifically, i. e. related to the throughput.

The improvement of efficiency and the involved efficiency increase also involve a reduction of the waste heat from the diesel engine, as the waste heat of the hydraulic pump and the hydraulic motor is completely cancelled, and only little waste heat from the generator and the electric motor and from the energy store will arise. Thereby, a further increase of efficiency is possible since the driving power of the fan drive of the cooling means is considerably reduced.

It will be even possible to improve the efficiency of the diesel engine of 0.35-0.4 with the more energy efficient drive according to the invention even if this does not appear to be possible with this system. This on the one hand results by the possibility of choosing a smaller type of diesel engine with the improved efficiency. Moreover, it will be possible to operate the more energy efficient diesel engine with the drive according to the invention at a more constant power since the load peaks and load valleys are largely compensated by the energy store and only load the diesel engine to a small degree. Therefore, a considerable specific improvement of the consumption is to be expected. It will be possible to improve the electric efficiency compared to the hydrostatic drive as per the present prior art from 0.4-0.6 to 0.8-0.9, which will lead, together with the improvement of the diesel engine, to a considerable saving of about 35-45% for the specific throughput.

With the change from hydraulic to electric drive components, a considerable decrease of noise emissions of at least 5 dB(A) is to be expected.

Figure 1:
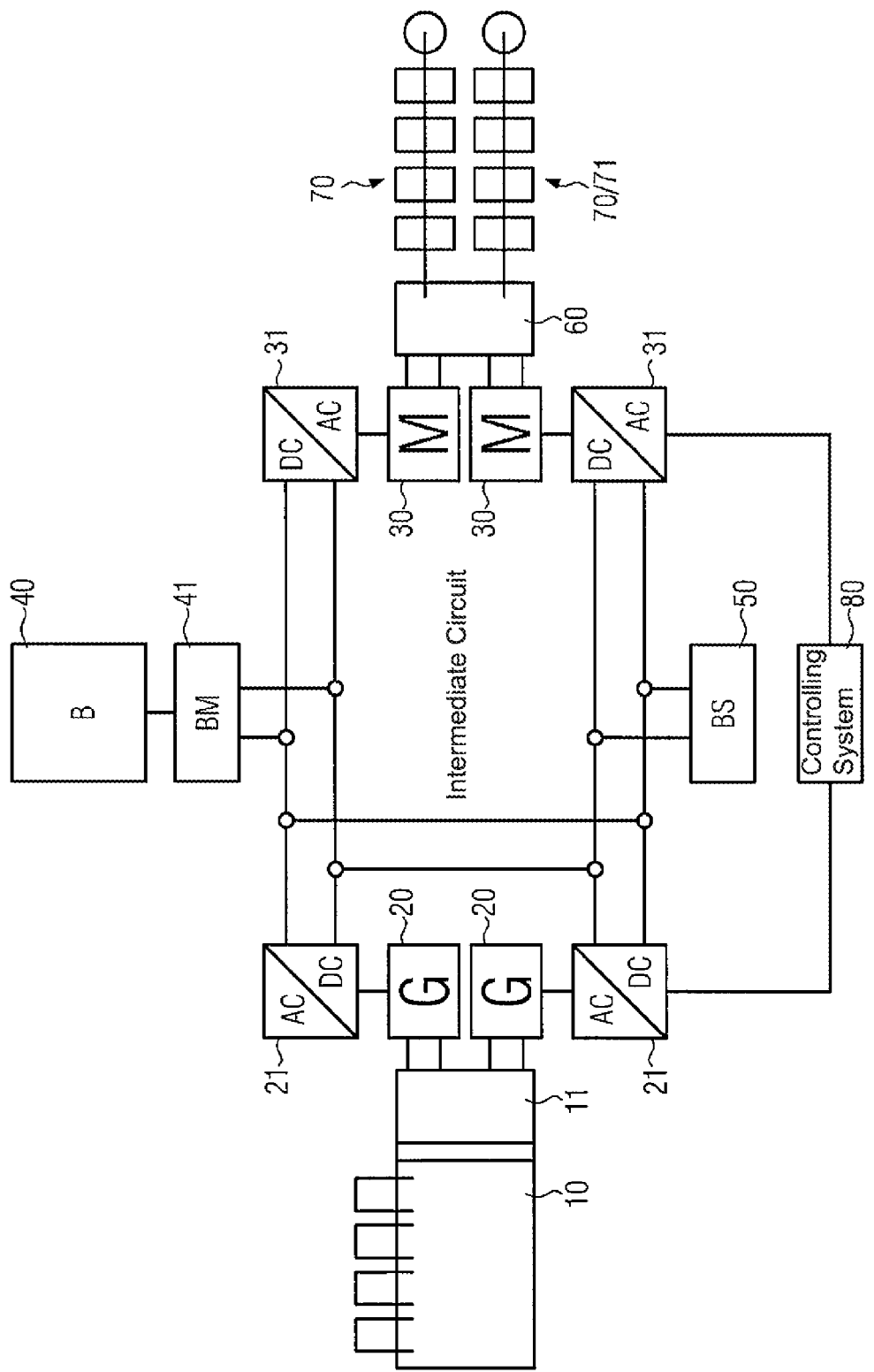
FIG. 1 shows an embodiment of the mobile waste comminuting device according to the invention.

FIG. 1 shows an embodiment of the waste comminuting device according to the invention.

This mobile waste comminuting device 100 according to the invention in this embodiment comprises: at least one comminuting shaft 70, an internal combustion engine 10, at least one generator 20 coupled to the internal combustion engine to convert mechanical energy of the internal combustion engine into electric energy, at least one electric motor 30 powered with this electric energy for driving the at least one comminuting shaft, and with another possibility of efficiency increase, an energy store 40 for storing electric energy generated by the generator during load valleys for covering load peaks, and a brake chopper 50 for avoiding surge voltages, and the controlling system or controller 80 necessary for the operation of all these components.

With this serial hybrid drive solution, a comminuting system with an improved efficiency may be provided. Here, it is in particular an advantage that an electric motor may afford a high torque already at very low speeds.

The generator 20 coupled to the internal combustion engine 10 to convert mechanical energy of the internal combustion engine into electric energy is provided for the generation of mechanical driving power for a comminuting shaft 70 of a mobile waste comminuting device with an electric motor 30 with electric energy.

For the two comminuting shafts 70, two electric motors 30 are provided, one for each comminuting shaft, which may also be connected mechanically by a reduction or synchronisation gear.

With the additional energy store 40 for storing the electric energy generated by the generator 20 during the idling of the crusher and during load valleys, the thus generated electric energy may be stored and then supplied, during the start and in case of load peaks, by the electric motor 30 of the comminuting shaft 70 as additional mechanical energy.

As an energy store 40, rechargeable condensers, so-called SuperCAPs, rechargeable batteries or accumulators, preferably on the basis of lithium-ion cells, UPS or uninterruptable power supplies, and electric flywheels are preferably employed.

To avoid surge voltages in the system generator 20 to the electric motor 30 and the energy store 40, in case of an immediate stop or an emergency stop of the comminuting system and a running on of the comminuting shaft, a so-called brake chopper 50 may be provided. The electric motor 30 is, in case of an immediate stop or an emergency stop to the generator, which will then, due to the high gear ratio, rotate at a very high speed and thus generate high voltage. The thus generated high voltage and energy is converted into heat by the brake chopper 50 and thus protects the other electric components from damages.

The internal combustion engine 10 and the electric motor 20 are provided in a serial hybrid arrangement, wherein the comminuting shaft may be driven only by the electric motor 30, and is in particular not directly mechanically connected to the internal combustion engine 10.

This has the advantage of a simple embodiment of the drive of the comminuting shaft, wherein the electric motor moreover may obtain a preferably large proportion of the power of the internal combustion engine 10 and may transmit a correspondingly large amount of power/torque to the comminuting shaft.

In this manner, the speed given by the internal combustion engine 10 and the speed of the comminuting shaft 70 may be matched.

A change of the direction of rotation in case of a blocked shaft 70 is in this case not effected by the transmission 60 but directly by the electric motor 30 by reversing the polarity in the control system.

The transmission arrangement may comprise a first transmission 11 for adapting the ratio of the speeds of the internal combustion engine and the generator 20, and/or a second transmission 60 for adapting the ratio of the speeds of the electric motor 30 and the comminuting shaft 70.

The function of the cooperation of the internal combustion engine 10 to generate the mechanical power, of the generator 20 to generate electric energy, and of the electric motor 30 to convert the electric energy into mechanical power for driving the comminuting shaft 70, and of an energy store 40 to cover the power required for the start and the load peak, and of the brake chopper 50 to avoid surge voltages and for a quick standstill of the shafts, is ensured by a complex control system 80 with corresponding software.

During the start of the internal combustion engine 10, the generator 20 is directly put into operation. The generator 20 preferably generates an alternating voltage of 400 V and preferably 50 Hz. A so-called AC/DC converter 21 or frequency converter is installed directly at the generator 20 or arranged separately.

This AC/DC converter 21 or frequency converter generates a so-called intermediate circuit as a direct current with a voltage of 200 to 800 V, preferably 650 V. If more than one generator 20 is provided, however, only one intermediate circuit is formed.

A DC/AC converter 31 or frequency converter is connected to this intermediate circuit and powers the electric motor 30 with electric energy, preferably with 400 V alternating voltage, and, depending on the speed, with the frequency required for this.

An energy store 40 is connected to the intermediate circuit in the more energy efficient embodiment. The energy store 40 may be a condenser, a battery or an accumulator, or an electric flywheel store. In this case, a corresponding management 41 of the energy store for loading and unloading is provided directly upstream of the energy store 40 or in the overall control system 80.

A combination of several equal or several different energy stores is also possible, for example, a battery energy store for the starting procedure of the crusher, and a condenser for covering the peak load.

The brake chopper 50 is also connected within the intermediate circuit to avoid surge voltages in the intermediate circuit in case the comminuting shaft continues rotating in case of an immediate stop.

The function of these components is, in terms of controlling, provided as follows: As soon as the internal combustion engine has reached the rated speed, preferably between 1,300 and 2,400 rpm, depending on the motor design, the generator 20 generates energy by which the electric motor 30 and thus the comminuting shaft 70 are put into operation.

During the start of the electric motor 30, first a very low speed of the comminuting shaft 70 is selected to thus provide a high torque. The electric motor 70 is, during the start, powered with electric energy not only by the generator 20 attached to the internal combustion engine 10 via the intermediate circuit, but also by the energy store 40.

The electric motors 30 preferably employed herein have the property of being able, for a short period of e.g. 60 seconds, to supply power or torque e. g. 50% above the nominal power.

Since this increased power from the electric motor 30 is in most cases only required during the starting procedure and during a temporary peak load, and since it is provided by an energy store 40, this permits to select a considerably smaller internal combustion engine with the attached generator 20 compared to a case where the power required for the starting procedure and for the peak load of the crusher has to be completely provided by the internal combustion engine.

After the starting operation with a very low speed of the comminuting shaft 70, the control system continuously increases the speed of the shaft 70, depending on the current consumption of the electric motor 30, up to the given admissible maximum speed or current consumption. This ensures a preferably high comminuting performance.

If in this controlling operation of the increase of the speed, the given maximum current consumption of the motor 30 is reached, the control system 80 automatically decreases the speed down to the given maximum current consumption and thereby increases the torque at the comminuting shaft 70.

This continued increase and decrease of the speed, and thus the decrease and increase of the torque output to the comminuting shaft 70, ensure that the torque optimal for the respective comminuting task is provided at all times and thus the highest possible throughput for comminuting is achieved.

Figure 2:
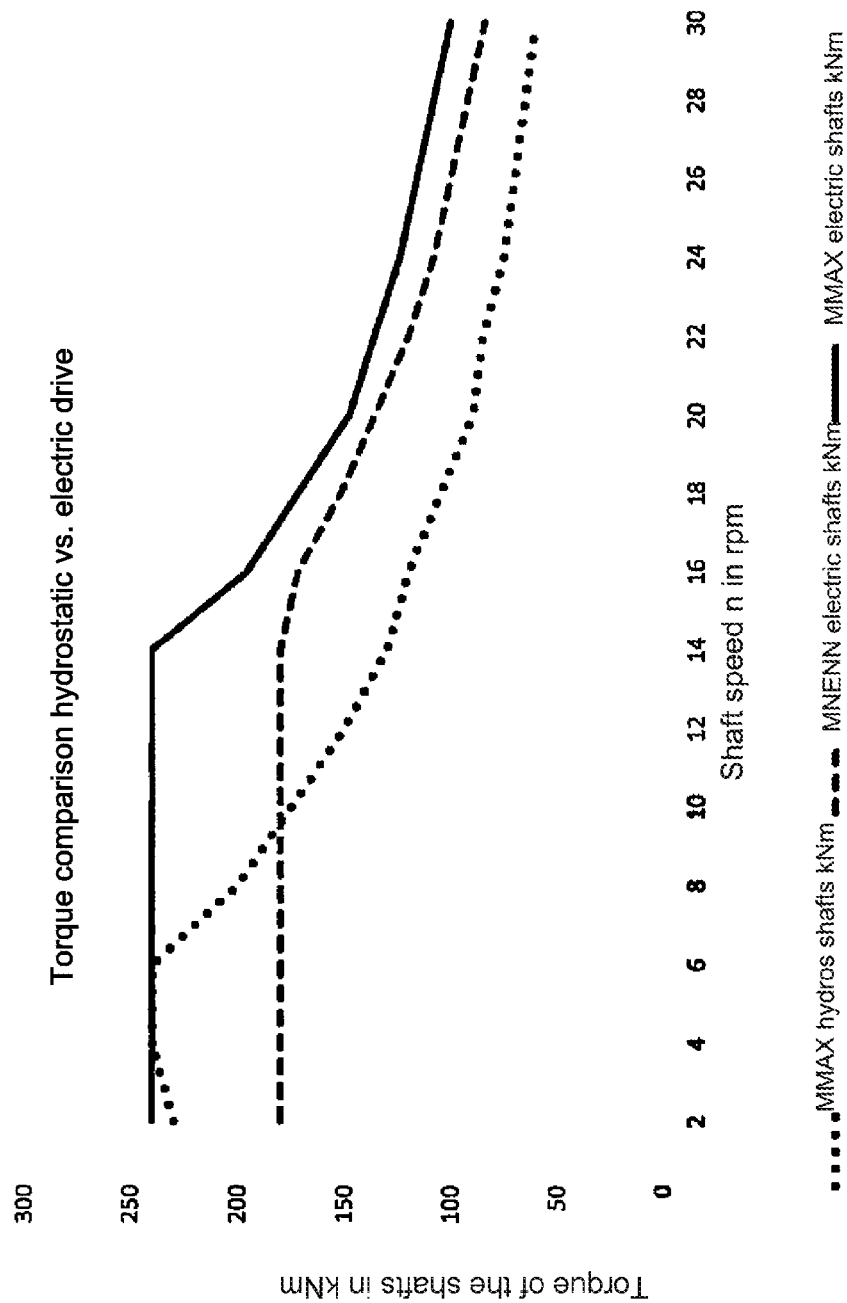
FIG. 2 shows a torque comparison of a hydrostatic versus an electric drive.

The diagram in FIG. 2 shows this torque and speed course in a comparison between the hydrostatic drive and the electric drive. The dotted curve shows the course according to the present prior art of a hydrostatic drive. The interrupted line reflects the course with the nominal power of the electric drive. The solid line forms the maximum torque of the electric drive temporarily available. The restriction at 240 kNm apparent in the diagram is mechanically due to the downstream transmission. The diagram clearly shows how the hydrostatic drive according to prior art may be reproduced with the electric drive with the design according to the invention.

In this control operation of increasing and decreasing the speed of the electric motor, the provision of additional energy, and thus additional power, at the electric motor 30 by the energy store 40 if so-called load peaks occur is moreover superposed.

Figure 3:
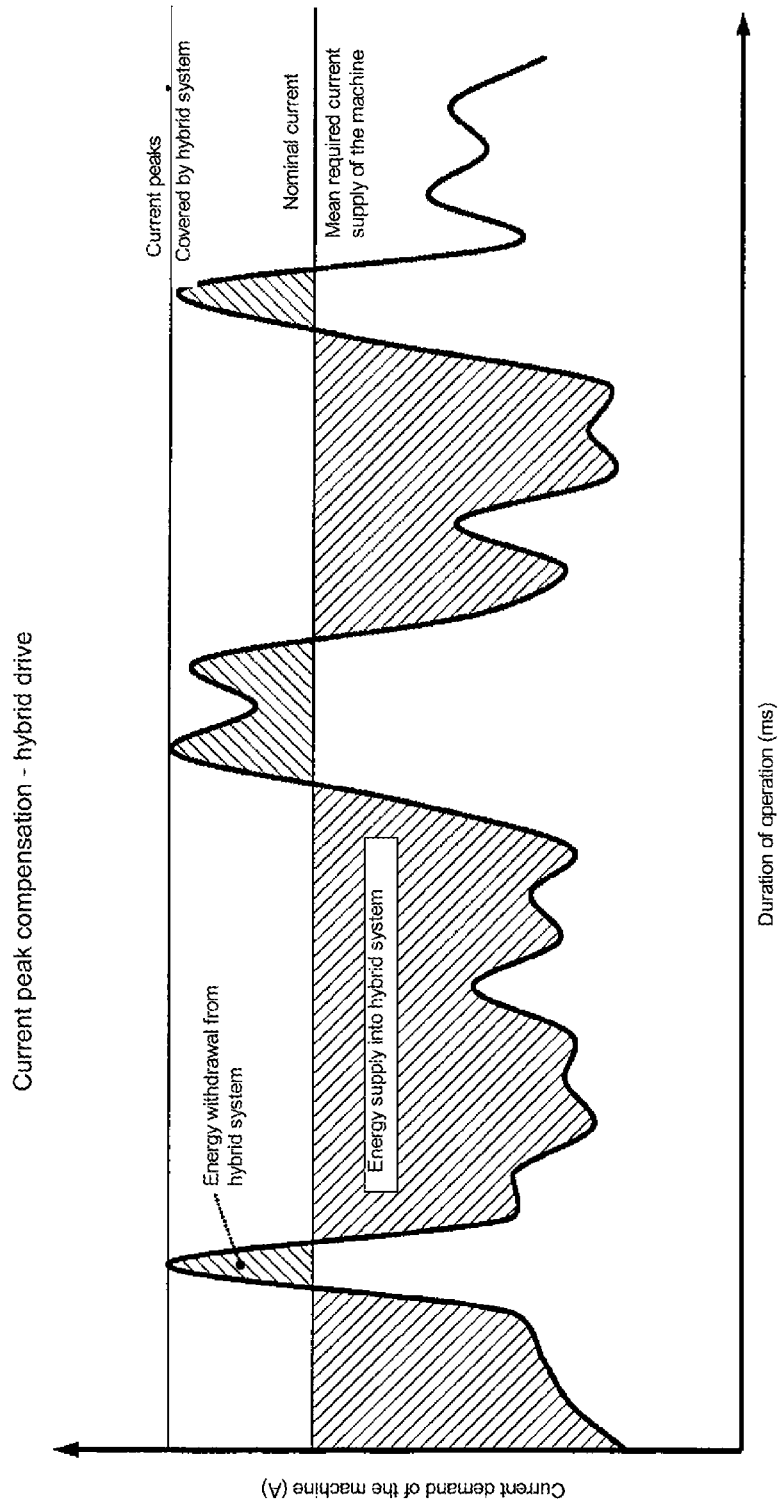
FIG. 3 illustrates the current peak compensation.

As is apparent from the diagram of FIG. 3, the comminuting process is effected with highly changing torques and thus highly changing power consumptions of the electric motor 30. The diagram clearly shows so-called load peaks and valleys. In the embodiment according to the invention, the nominal power of the system and thus of the diesel or internal combustion engine 10 and the generator 20 will be preferably designed in the centre between the load peaks and valleys to be expected.

In the more energy efficient variant, the energy required for covering load peaks is provided by the energy store 40. The internal combustion engine 10 and thus the generator 20 are here preferably operated within the nominal power range, and the additional required power for covering the load peaks is afforded by the energy store 40.

Since the load peaks do not have to be covered by the power of the system, a smaller size of the components of the internal combustion engine 10 and the generator 20 is possible.

If load valleys occur again, as can be taken from FIG. 3, the recharge of the energy store 40 is effected via the generator 20, the AC/DC converters 21 and the energy store management 41 so that the thus stored energy is available for further covering load peaks.

By the change of the direction of rotation of the electric motor 30 and thus the comminuting shafts 70, a so-called running free of the comminuting shafts 70 is to be achieved.

For the changed direction of rotation of the comminuting shaft 70, the corresponding speed, the maximally admissible current consumption of the electric motor 70, and the duration of the changed direction of rotation are specified by the control system 80 and can be freely selected, wherein the control operation described above is effected as in the normal direction of rotation.

As soon as the time of the changed direction of rotation of the comminuting shaft 70 has lapsed, the above-described starting procedure for the normal direction of rotation is initiated again.

The brake chopper 50 provided in another embodiment is also included in the control system. In case of an immediate stop or an emergency stop of the comminuting system, the power supply from the generator to the electric motor is immediately stopped. Since with all these comminuting systems one cannot exclude a further rotation of the shaft after the electric stop, this brake chopper 50 is provided.

If the shaft 70 still rotates after the electric energy has been switched off, the electric motor 30 becomes a generator. Due to the high gear ratio of the transmission between the electric motor and the shaft, the electric motor now rotates as a generator at a very high speed. This also means that a very high voltage is generated.

The brake chopper 50 on the one hand protects the other electric components of the system from surge voltages, and thus from damages, and on the other hand takes care that the comminuting shaft comes to a standstill preferably directly after the immediate stop or the emergency stop.

The drawing in FIG. 1 shows, by way of example, the embodiment 100 with two generators 20 and two electric motors 70, two comminuting shafts 70 and an energy store 40 as a battery, and a brake chopper 50.

For the first transmission 11 described in the embodiment 100, another transmission or gear element, such as a V-belt or a sprocket belt, may be provided. Moreover, in front of the main transmission 60 (second transmission), a further transmission downstream of the electric motors 30 is conceivable. Equally, other transmission and gear elements may be provided here. The embodiment as a transmission or cylindrical gear is here only given by way of example.

This waste comminuting device according to the invention in this embodiment 100 comprises two comminuting shafts 70; an internal combustion engine (diesel engine) 10;

two generators 20 coupled to the internal combustion engine 10 via a first transmission 11 to convert mechanical energy of the internal combustion engine 10 into electric energy; two AC/DC converters 21 or frequency converters; and two electric motors 30 for driving the comminuting shaft 70 via a second transmission 60, and two DC/AC converters 31 or frequency converters; an energy store as a battery 40 and the corresponding battery management 41.

The generators 20 may supply the generated electric energy via the two AC/DC converters 21 or frequency converters to the electric motors 30 and/or via the energy store management 41 into the energy store 40. The energy store may comprise, for example, a rechargeable battery, a condenser, an uninterruptable power supply (UPS), or a flywheel store.

The internal combustion engine 10 and the electric motors 30 are, in this exemplary embodiment, provided in a serial hybrid arrangement, wherein the comminuting shaft 70 may only be driven with the electric motor 30, and not directly with the internal combustion engine 10.

The first transmission 11 is here embodied as a cylindrical gear to increase the speed of the internal combustion engine 10 to a higher speed of the generators 20. With the second transmission 60, a reduction of the speed of the electric motor 30 to the desired speed of the comminuting shaft 70 is effected. This permits a smaller design of the electric motor 30 as otherwise—without the second transmission 60—the electric motor 30 would have to afford a large torque with comparably low speeds which may only be effected by a larger design of the electric motor.

The shown embodiments are only given by way of example, and the complete scope of the present invention is defined by the claims.

The invention claimed is:

1. A mobile waste comminuting device, comprising:
   at least one comminuting shaft;
   an internal combustion engine;
   at least one generator that is coupled to the internal combustion engine to convert mechanical energy of the internal combustion engine into electric energy;
   at least one electric motor powered with the electric energy for driving the at least one comminuting shaft; and
   an energy store for storing energy, wherein the energy store at least partly powers the at least one electric motor with electric energy, stores energy during periods of low power demand, and supplies energy during periods of high power demand relative to the nominal power of the at least one generator, and
   wherein the at least one electric motor is configured for changing the direction of rotation of the at least one comminuting shaft.

2. The mobile waste comminuting device according to claim 1, furthermore comprising:
   at least one AC/DC converter to convert alternating current from the at least one generator into direct current, a DC/AC converter to convert direct current into alternating current for the at least one electric motor, and an intermediate circuit arranged between the AC/DC converter and the DC/AC converter with an energy management module for coupling the energy store, wherein each electric motor is an AC motor.

3. The mobile waste comminuting device according to claim 1, wherein the speed of the at least one comminuting shaft is changeable by the at least one electric motor.

4. The mobile waste comminuting device according to claim 2, wherein the speed of the at least one comminuting shaft is changeable by the at least one electric motor.

5. The mobile waste comminuting device according to claim 1, furthermore comprising:
   a device for avoiding surge voltages comprising a brake chopper for restricting a voltage in the intermediate circuit.

6. The mobile waste comminuting device according to claim 2, furthermore comprising:
   a device for avoiding surge voltages comprising a brake chopper for restricting a voltage in the intermediate circuit.

7. The mobile waste comminuting device according to claim 3, furthermore comprising:
   a device for avoiding surge voltages comprising a brake chopper for restricting a voltage in the intermediate circuit.

8. The mobile waste comminuting device according to claim 3, furthermore comprising:
   a controller configured to control the energy flux between the at least one generator, the at least one electric motor and the energy store.

9. The mobile waste comminuting device according to claim 2, furthermore comprising:
   a controller configured to control the energy flux between the at least one generator, the at least one electric motor and the energy store.

10. The mobile waste comminuting device according to claim 3, furthermore comprising:
    a controller configured to control the energy flux between the at least one generator, the at least one electric motor and the energy store.

11. The mobile waste comminuting device according to claim 1, furthermore comprising a controller, wherein the controller is configured to at least one selected from the group of (i) control the operation of the internal combustion engine, (ii) control the energy flux between the at least one generator, the at least one electric motor and the energy store, wherein a power quantity not available from the generator for driving the at least one comminuting shaft is provided from the energy store for the electric motor, (iii) if the torque for the comminuting at a certain speed is not sufficient, cause an increase of the torque whereby the electric motor power and the torque are increased, and if the torque is still not sufficient, the speed is reduced and the torque further increased, (iv) restrict the power maximally taken from the at least one generator to the nominal power, (v) release a starting procedure of the waste comminuting device and the driving of the at least one comminuting shaft only when the minimum energy quantity is contained in the energy store, (vi) control the energy supply from the energy store to the at least one electric motor for covering the load peaks that are beyond the nominal power of the at least one generator, (vii) if load valleys occur where a power consumption of the at least one electric motor falls below the nominal power of the at least one generator, employ a difference between the nominal power and the power consumption of the at least one electric motor for charging the energy store, and (viii) in case of a braking operation of the at least one comminuting shaft, operate the at least one electric motor as a generator and use the power generated in the process for charging the energy store.

12. The mobile waste comminuting device according to claim 1, wherein the energy store comprises at least one selected from the group of an electric energy store and a mechanical energy store];

wherein the electric energy store comprises at least one selected from the group of a rechargeable battery, a condenser, a superconducting magnetic energy store, and a static, uninterruptable power supply (UPS); and wherein the mechanical energy store comprises at least one selected from the group of a dynamic UPS, a centrifugal mass store and a flywheel store.

13. The mobile waste comminuting device according to claim 12, wherein in case of a mechanical energy store, a converter device to convert electric into mechanical and mechanical into electric energy is provided.

14. The mobile waste comminuting device according to claim 1, wherein two or more comminuting shafts are provided with one electric motor each, wherein one generator each is provided for each electric motor.

15. The mobile waste comminuting device according to claim 1, wherein the energy store is chargeable via a mains connection.

16. A method of operating a mobile waste comminuting device comprising the steps of:
    providing a mobile waste comminuting device comprises at least one comminuting shaft, an internal combustion engine, at least one generator that is coupled to the internal combustion engine, at least one electric motor and one energy store;
    operating the internal combustion engine;
    generating electric energy with the at least one generator;
    driving the at least one comminuting shaft with the at least one electric motor;
    storing energy in the energy store during periods of low power demand relative to a nominal power of the at least one generator; and
    at least partly powering the at least one electric motor with electric energy from the energy store, wherein the powering step comprises powering the at least one electric motor with electric energy from the energy store for covering a portion of periods of high power demand going beyond the nominal power of the at least one generator, and wherein the method further comprises the step of reversing the direction of rotation of the at least one comminuting shaft by the at least one electric motor.

17. The method according to claim 16, furthermore comprising at least one selected from the group of (i) controlling the energy flux between the at least one generator, the at least one electric motor and the energy store, wherein a power quantity not available from the generator for driving the at least one comminuting shaft is provided from the energy store for the electric motor, (ii) if the torque for comminuting at a certain speed is not sufficient, increasing the torque whereby the electric motor power and the torque are increased, and if the torque is still not sufficient, the speed is reduced and the torque further increased, (iii) restricting the power maximally taken from the at least one generator to the nominal power, (iv) starting the waste comminuting device if a minimum energy quantity is contained in the energy store, (v) driving the at least one comminuting shaft after the starting procedure of the waste comminuting device if the minimum energy amount is contained in the energy store, (vi) controlling the energy supply from the energy store to the at least one electric motor for covering the load peaks that are beyond the nominal power of the at least one generator, (vii) if load valleys occur where a power consumption of the at least one electric motor falls below the nominal power of the at least one generator, charging the energy store by utilizing a difference between the nominal power and the power consumption of the at least one electric motor, and/or (viii) operating the at least one electric motor as a generator in case of a braking operation of the at least one comminuting shaft and using the power generated thereby for charging the energy store.

18. The method according to claim 16, comprising the further steps of:
    converting the alternating current from the at least one generator into direct current,
    using at least a portion of the direct current for storing energy in the energy store, and
    converting direct current into alternating current for supplying the at least one electric motor embodied in the form of an alternating current motor with at least one selected from the group of (i) energy from the at least one generator and (ii) with energy from the energy store.

19. The method according to claim 16, comprising the further step of:
    restricting the voltage generated during a braking operation of the at least one comminuting shaft by the at least one electric motor acting as a generator.

* * * * *